US012718158B2

(12) United States Patent
St. Pierre et al.

(10) Patent No.: US 12,718,158 B2
(45) Date of Patent: Aug. 25, 2026

(54) PREDICTING DOWNSTREAM SCHEDULE EFFECTS OF USER TASK ASSIGNMENTS

(71) Applicant: Oracle International Corporation, Redwood Shores, CA (US)

(72) Inventors: Robert St. Pierre, Campbell, CA (US); Mark Pearson, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 280 days.

(21) Appl. No.: 18/446,375

(22) Filed: Aug. 8, 2023

(65) Prior Publication Data

US 2024/0127141 A1 Apr. 18, 2024

Related U.S. Application Data

(60) Provisional application No. 63/416,504, filed on Oct. 15, 2022.

(51) Int. Cl.
*G06Q 10/0631* (2023.01)
*G06N 20/00* (2019.01)
*G06Q 10/0633* (2023.01)
*G06Q 10/0639* (2023.01)
*G06Q 10/20* (2023.01)

(52) U.S. Cl.
CPC ..... *G06Q 10/063112* (2013.01); *G06N 20/00* (2019.01); *G06Q 10/063114* (2013.01); *G06Q 10/063116* (2013.01); *G06Q 10/0633* (2013.01); *G06Q 10/06398* (2013.01); *G06Q 10/20* (2013.01)

(58) Field of Classification Search
None
See application file for complete search history.

(56) References Cited

U.S. PATENT DOCUMENTS 6,336,053 B1 1/2002 Beatty
8,548,838 B1 10/2013 Ganesan (Continued)

OTHER PUBLICATIONS

"Application Help for SAP Manufacturing Execution", Retrieved from https://help.sap.com/docs/SAP_MANUFACTURING_EXECUTION/e1adc70af32241619335c8768a892edb/04510820335f4e129df327de58689a22.html, Jan. 3, 2023, pp. 43.
"How To Set Up and Use the SAP ME Assembly Feature", Version 1.3, Mar. 2012, pp. 37.
"Labor Management for Semiconductor", Retrieved from https://www.plm.automation.siemens.com/global/en/products/manufacturing%E2%80%90operations/labo%E2%80% 90management%E2%80%90for%E2%80%90semiconductor.html, Retrieved on Jan. 3, 2023, pp. 4.

(Continued)

*Primary Examiner* — Folashade Anderson
(74) *Attorney, Agent, or Firm* — Invoke

(57) ABSTRACT

Techniques for managing task assignments to workers in a work environment are disclosed. A system identifies one or more workers with qualifications that match recommended qualifications to perform a task in a work environment. The system applies a trained machine learning model to task performance data associated with the worker, such as a past history of tasks performed and statistics associated with the performance of the task. The machine learning model generates a prediction of downstream effects associated with assigning the task to the user. The downstream effects include delays and performance improvements on subsequent tasks performed by the worker, as well as effects on tasks performed by other workers, at work centers in the work environment.

19 Claims, 8 Drawing Sheets

(56) References Cited

U.S. PATENT DOCUMENTS

| | | | | |
|---|---|---|---|---|
| 8,843,929 | B1 * | 9/2014 | Oppenheimer ....... | G06F 9/5044 718/102 |
| 11,101,876 | B2 * | 8/2021 | Kargieman ............ | H04N 7/183 |
| 2007/0244736 | A1 * | 10/2007 | Johnson ............. | G06Q 10/1097 705/7.27 |
| 2008/0078834 | A1 | 4/2008 | Woodward | |
| 2008/0183538 | A1 | 7/2008 | Hamadi et al. | |
| 2013/0151421 | A1 * | 6/2013 | Van Der Ploeg ...... | G06Q 10/06 705/301 |
| 2013/0325763 | A1 * | 12/2013 | Cantor ............. | G06Q 10/06312 706/12 |
| 2014/0277596 | A1 | 9/2014 | Nixon et al. | |
| 2017/0337492 | A1 * | 11/2017 | Chen .................. | G06Q 10/0633 |
| 2019/0130512 | A1 * | 5/2019 | Kuhn ...................... | H04L 67/00 |
| 2019/0213509 | A1 | 7/2019 | Burleson et al. | |
| 2021/0256453 | A1 * | 8/2021 | Morgan ............... | G06Q 10/109 |
| 2022/0374442 | A1 * | 11/2022 | Kaspa ................. | G06F 16/2282 |
| 2022/0374815 | A1 * | 11/2022 | Perry ............... | G06Q 10/06316 |
| 2024/0127140 | A1 * | 4/2024 | St. Pierre ......... | G06Q 10/06393 |

OTHER PUBLICATIONS

"Labor Management", Retrieved from https://metasmartfactory.com/labor-management/, Retrieved on Jan. 3, 2023, pp. 4.

"Manufacturing Execution System", Siemens Software, Retrieved from https://plm.sw.siemens.com/en-US/opcenter/manufacturing-execution-system-mes-capabilities/, Retrieved on Jan. 3, 2023, pp. 7.

"Production Planning, Scheduling, and Management Software", Retrieved from https://www.plex.com/products/manufacturing-execution-system/production-planning-scheduling-and-management-software, Retrieved on Jan. 3, 2023, pp. 1-4.

"Using the Work Center UI Form", Retrieved from https://docs.infor.com/factorytrack/6.01/enus/ftslolh/csj1463472759920.html, Retrieved on Jan. 3, 2023, pp. 1-4.

Tropschuh et al., "Activity-based shop floor management—A concept to enhance flexibility", Conference on Production Systems and Logistics CPSL, 2020, pp. 259-268.

* cited by examiner

FIG. 1

DISPLAY
512
INPUT
DEVICE
514
CURSOR
CONTROL
516
MAIN
MEMORY
506
ROM
508
STORAGE
DEVICE
510
BUS
502
PROCESSOR
504
COMMUNICATION
INTERFACE
518
500
NETWORK
LINK
520
528
INTERNET
ISP
526
SERVER
530
LOCAL
NETWORK
522
HOST
524

PREDICTING DOWNSTREAM SCHEDULE EFFECTS OF USER TASK ASSIGNMENTS

BENEFIT CLAIMS; RELATED APPLICATIONS; INCORPORATION BY REFERENCE

The following application is hereby incorporated by reference: application No. 63/416,504, filed Oct. 15, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure relates to work center resource network integration. In particular, the present disclosure relates to operations and user interfaces for predicting the downstream effects of assigning particular work center tasks to particular users.

BACKGROUND

In physical facilities, such as manufacturing plants, workers at many different work stations interact with equipment to perform tasks on materials, such as product components. Many different events may result in sub-optimal performance of a manufacturing facility. For example, a drop in a worker's productivity may result in delays to subsequent tasks and failure to deliver products on time. Equipment breakdown may take a work center out of action for a time, resulting in delays to any tasks that rely on the work center. Tracking multiple different performance metrics across the manufacturing facility may be a complex data gathering and analysis process. Identifying a source of a problem—whether a fault or a failure to meet specified performance metrics—can be even more challenging. Determining how to re-order tasks performed by workers to improve performance metrics based on the identified problems adds yet another layer of complexity. A task manager may not have a clear idea of how rearranging tasks will affect other tasks, or how effective the changes would be to improve performance metrics the task manager is most concerned about. For example, if a machine breaks down, a task manager can send materials to another work center to have another worker perform a task. However, the task manager may not be able to predict how effective the change would be to overall equipment utilization, worker utilization, or on-time deliveries. The task manager may also not be able to predict the repercussions a task reordering may have on additional tasks at other work centers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1 illustrates a system in accordance with one or more embodiments;

DETAILED DESCRIPTION

Figure 2A:
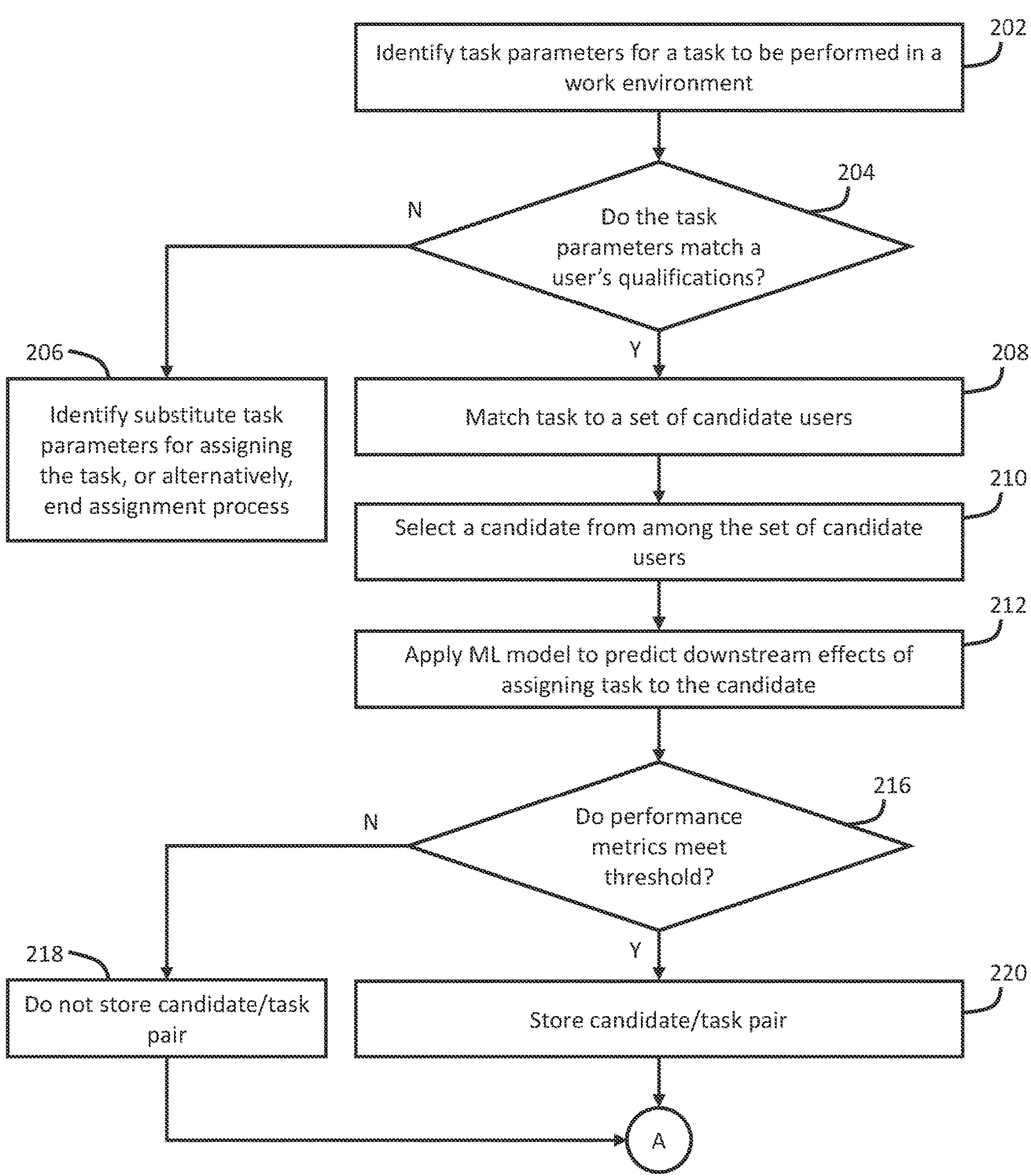
FIGS. 2A-2B illustrate an example set of operations for predicting downstream effects of assigning tasks to users in a work environment in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING PREDICTIONS FOR DOWNSTREAM EFFECTS OF TASK ASSIGNMENTS TO USERS
4. TRAINING A MACHINE LEARNING MODEL
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments use a machine learning model to predict downstream effects of assigning tasks to users. A work environment may have many different work centers. Each work center may be utilized by multiple different workers at various times, or even at the same time, to perform different tasks. The speed and effectiveness with which a worker is able to perform a task affects downstream tasks performed by the same worker and performed by different workers both at the same work center and at other work centers. Accordingly, assigning a particular task to a particular worker affects the worker's task schedule, a task schedule associated with the work center where the task is performed, and task schedules of other workers performing tasks at other work centers. The machine learning model predicts the downstream effects of assigning tasks to users on a task schedule for multiple workers at multiple work centers.

One or more embodiments train a machine learning model using data sets describing: user attributes, work center attributes, and materials attributes. For example, the machine learning model identifies relationships between a user's experience performing a task or using particular equipment and materials and a time required by the user to complete tasks. As an example, a system may detect a fault in a piece of equipment. The system may identify two users who have qualifications that match recommended user qualifications for a task to repair the equipment. Based on (a) the users' work histories, (b) the users' proficiencies specified in the users' profiles, and (c) scheduling data of additional tasks to be performed in a work environment, work centers available for performing tasks, and other users available to perform the tasks, the system predicts downstream effects of assigning the repair task to the first user and the second user. The predicted downstream effects take into account not just which tasks are performed at various work centers, but also which workers are assigned to the tasks at the work centers. The system may predict that the first user may perform the task 10% faster than the second user at the same work center. However, the system may further predict that assigning the task to the first user results in additional delays to tasks performed by other users in the work environment. The system may determine that those additional delays result in a 10% decrease in on-time deliveries for the week from the work environment compared to when the repair task is assigned to the second user. The system may further determine that assigning the task to the first user results in an increased financial cost of 1%, reflecting overtime payments to the first worker to perform the task. One or more embodiments refrain from assigning a task to a user based on determining the downstream effects of the assignment result in costs (or negative performance metrics) that exceed a threshold. In addition, or in the alternative, the system may present two or more options for assigning a task to users to an administrator to allow the administrator to select a user to whom to assign a task.

One or more embodiments described in this Specification and/or recited in the claims may not be included in this General Overview section.

2. System Architecture

Figure 1:
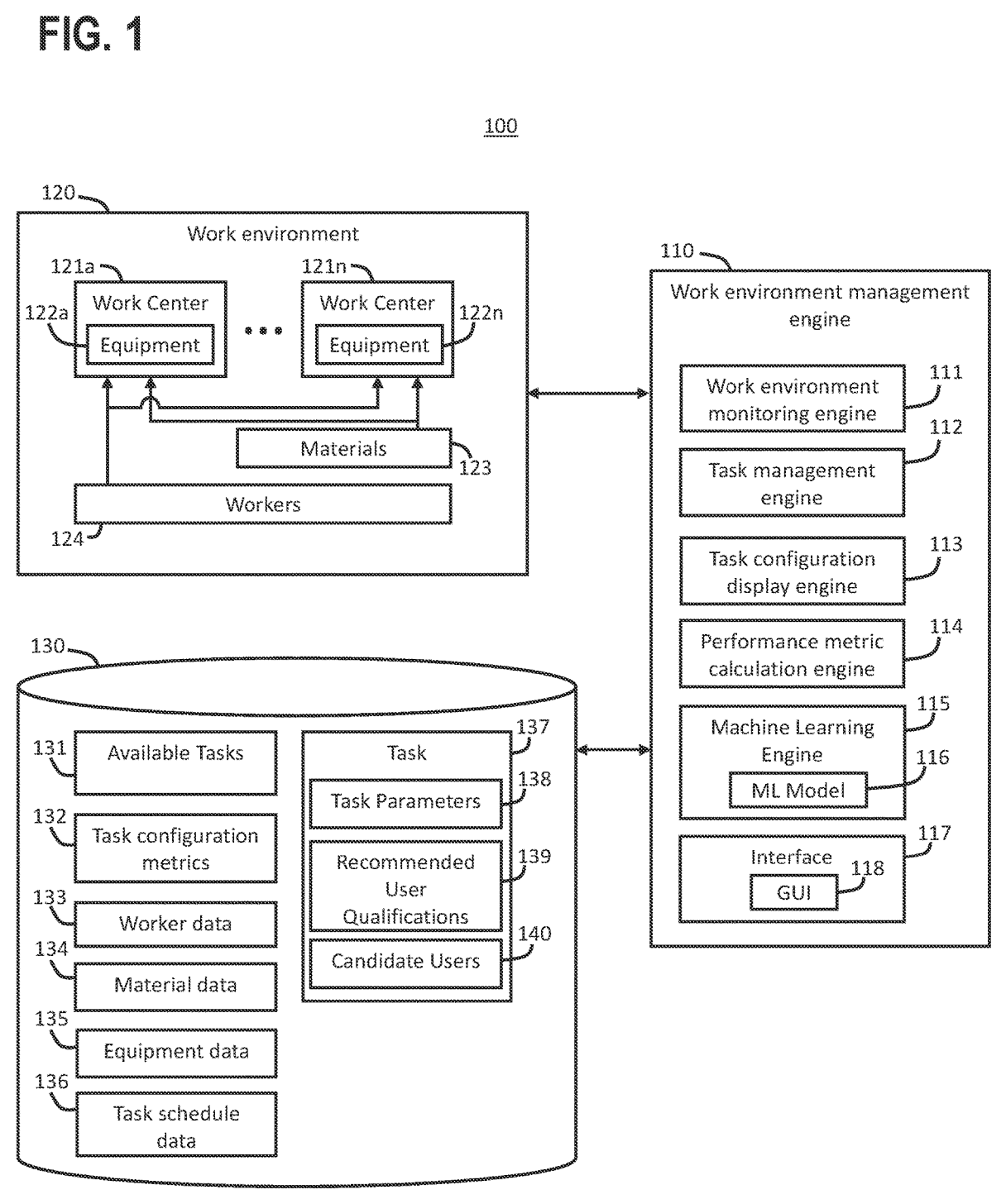

FIG. 1 illustrates a system 100 in accordance with one or more embodiments. As illustrated in FIG. 1, system 100 includes a work environment management platform 110 and a data repository 130. The work environment management platform 110 monitors and manages operations in a work environment 120. As an example, a work environment may be a manufacturing facility. The facility includes work centers 121*a*-121*n*. Each work center includes a set of equipment 122*a*-122*n*. One work center may be a component assembly work center. At a component assembly work center, workers may assemble components from materials 123. Components assembled at one work center may be the materials required to perform additional tasks at another work center. Another work center may be a component testing work center. The component testing work center may include equipment to test components assembled at the component assembly work center to check for flaws or failures in the components. Another work center may be a quality assurance work center. The quality assurance work center may include equipment to run tests on the components assembled at the component assembly work center, and tested at the component testing work center, to ensure the components meet specifications. One or more workers 124 may be assigned to work at a particular work center 121*a*-121*n*. When a worker 124 logs in to a terminal at a work center, the terminal identifies the tasks to be performed by the worker 124. The terminal may further grant and deny access to equipment 122*a*-122*n* at the work center, according to the worker's assigned tasks and authorization level.

According to one or more embodiments, the work environment 120 includes work centers 121*a*-121*n* associated with various pieces of equipment 122*a*-122*n*. A work center may include a user terminal, testing equipment, manufacturing equipment (e.g., saws, drills, etc.) or any other equipment for manufacturing, assembling, and testing components. Different types of equipment require different qualifications for workers 124 to handle the equipment. One or more embodiments analyze worker qualifications to manage the worker's access to equipment associated with a work center.

According to one or more embodiments, different workers 124 may access terminals at the same work centers 121*a*-121*n*. When a first worker logs in to a terminal, the task management engine 112 may obtain user identification information, map the user identification information to stored user qualifications information, and identify one or more tasks the first worker is authorized and/or qualified to perform at the work center. When a second worker logs in to the same terminal, the task management engine 112 may identify a different set of tasks that the second worker is authorized and/or qualified to perform at the work center.

In an embodiment, the work environment management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

The work environment management platform 110 includes a work environment monitoring engine 111 to monitor attributes of the work environment 120. The work environment monitoring engine 111 may monitor worker status data, equipment status data, materials status data, and other work environment data. Monitoring worker status data may include detecting a worker log in/log out at a work center terminal, detecting a selection by a worker at a work center terminal to begin or pause a task or indicate a particular task has been completed, and detecting notifications requesting particular workers at particular work centers 121*a*-121*n* in the work environment 120. Monitoring equipment status data may include monitoring whether a piece of equipment is operational or out of service (e.g., in a fault state), monitoring the calibration status of equipment, and monitoring whether equipment is in use and for how long the equipment has been in use. Monitoring materials data may include detecting a location of materials in the work environment 120 and detecting a quantity of materials available in the work environment. As an example, a work center may include bins containing materials for assembling a device. As a user removes materials from the bin, a sensor may detect the change in weight of the bin. The work environment monitoring engine 111 may calculate the quantity of materials in the bin based on the weight of the bin.

Monitoring the work environment includes detecting anomalies and faults in the work environment. For example, the work environment monitoring engine 111 may receive a notification from a piece of work equipment 122*a* at work center 121*a* that the equipment is not functioning correctly. In addition, the work environment monitoring engine 111 may monitor performance statistics of workers 124 to determine that a particular worker at work center 121*n* is not performing tasks at an expected rate, resulting in delays in the work environment 120.

The task management engine 112 generates and manages the assignment of tasks to workers 124 in the work environment 120. The task management engine 112 detects a worker login to a work center 121*a*-121*n*. The task management engine 112 analyzes (a) worker data 133, including worker qualifications, (b) equipment data 135 corresponding to equipment available at the work center 121*a* where the worker logged in, and (c) material data 134 of material available at the work center 121*a* where the worker logged in. Based on the worker data 133, equipment data 135, and material data 134, the task management engine 112 presents to a worker at the work center 121*a* a sub-set of tasks from among the set of available tasks 131 to be performed by the worker at the work center 121*a*. In one or more embodiments, the task management engine 112 generates the subset of tasks taking into account a dependency among tasks. For example, repairing a piece of faulty equipment 122*a* may include two tasks performed by two different experts, with one task following the other. When the second expert logs in to work center 121*a*, the task management engine 112 determines whether the first task in the set of two sequential tasks has been completed by another expert. If so, the task management engine 112 presents the second task to the second expert to be performed. If the first task has not yet been completed, the task management engine 112 may refrain from presenting the second task to the second expert. In addition, or in the alternative, the task management engine 112 may generate a notification to one or both of the first expert and the second expert indicating the first task has not yet been completed.

According to one or more embodiments, a manager or administrator may access the work environment management platform 110 via an interface 117 to view task pools, task assignments, and worker qualifications. In one or more embodiments, interface 117 refers to hardware and/or software configured to facilitate communications between a user and the work environment management platform 110. Interface 117 renders user interface elements and receives input via user interface elements. Examples of interfaces include a graphical user interface (GUI) 118, a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

According to one embodiment, the task configuration display engine 113 displays a representation of a task schedule in the GUI 118. For example, the task configuration display engine 113 may generate data to display a Gantt chart in the GUI 118. The Gantt chart may include a representation of work centers and tasks that (a) have been performed and (b) are scheduled to be performed at the respective work centers. The task configuration display engine 113 may generate the Gantt chart based on worker attributes. For example, the task configuration display engine 113 may access a worker schedule to predict which workers are assigned to work at different work centers. The task configuration display engine 113 may modify the visual representation of tasks in the GUI 118 based on which workers are assigned or predicted to perform the tasks. For example, a work environment 120 may include a component assembly work center. Two different workers may be assigned to work at the component assembly work center. One of the workers may have a higher efficiency rating than the other. Accordingly, the task configuration display engine 113 may display in the Gantt chart a first set of tasks completed at the work center by the first worker, and a second set of tasks completed at the work center by the second worker. The task configuration display engine 113 may display more tasks in the first set of tasks than in the second set of tasks, representing, based on the first worker's higher efficiency rating, a prediction that the first worker will complete more of the tasks than the second worker in the same period of time.

According to one or more embodiments, a performance metric calculation engine 114 calculates performance metrics in the work environment 120. Performance metrics include metrics for particular workers 124, metrics for work centers 121*a*-121*n*, and metrics for the entire work environment 120. The performance metrics include quantitative measurements of the performance of one or more of (a) workers, (b) work centers, and/or (c) a work environment. Examples of performance metrics include a utilization rate—or a percentage of time that a piece of equipment is in use—for a particular work center and/or across the entire work environment, task completion times for particular tasks, on-time delivery statistics, efficiency statistics, cost-estimate statistics, and/or overall equipment effectiveness (OEE) statistics for a worker, work center, and/or the work environment.

According to one embodiment, the task configuration display engine 113 displays in the GUI 118, together with a visual representation of a task schedule for tasks to be performed at work centers 121*a*-121*n*, one or more worker-task assignment selection tiles corresponding to one or more workers that an administrator may select for performing a task. The task configuration display engine 113 may display a Gantt chart in one region of a graphical user interface and the worker-task assignment selection tiles in another region. For example, the worker-task assignment selection tiles may be located above, below, or to a side of the representation of the work environment.

According to one example embodiment, the system stores, for each available task 131, task data including task parameters and candidate users who are authorized and/or qualified to perform the task. For example, for a task 137, the task management engine 112 identifies (a) task parameters 138 including (b) recommended user qualifications 139. The task management engine 112 identifies a pool of candidate users 140, from the workers included in the worker data 133, whose qualifications match the recommended user qualifications 139 for the task 137. The task management engine 112 stores identification information for the candidate users 140 in a data object corresponding to the task 137. For example, the task management engine 112 may store employee identification numbers and/or names of the employees in a field or set of fields in the data object representing the task 137.

The task management engine 112 identifies a set of candidate users 140 to present to an administrator in a GUI 118. For example, the task management engine 112 may identify performance metrics and/or qualifications matches associated with the users and the task 137 to identify a set of candidate users 140 to present to the administrator. As an example, the task 137 may store identification information for four candidate users 140 who are authorized and qualified to perform the task 137. Based on qualifications matches and performance metrics associated with the users, the task management engine 112 may identify two users from among the candidate users 140 to present to the administrator. The task configuration display engine 113 displays in the GUI 118 two worker-task assignment selection tiles corresponding to the two identified workers.

In one or more embodiments, the task management engine 112 applies a machine learning model 116 to a set of (a) task schedule data 136 and (b) worker data 133 to predict downstream effects of assigning particular tasks to particular workers. The task schedule data 136 includes information regarding which tasks are predicted to be performed at different work centers by different workers over a particular period of time. The worker data 133 includes: worker qualifications data, such as the worker's certifications, demonstrated proficiency with particular equipment, and educational background; historical task assignments, completed tasks, and task performance results; performance metrics, such as the worker's efficiency at completing tasks, the worker's success rate at completing assigned tasks, a recidivism rate (e.g., if a task involved modifying equipment, how long did it take until the same task needed to be performed on the same equipment); worker scheduling data, such as a worker's availability; and worker profile data, such as the identity of a worker's manager or supervisor, the worker's position on an organizational chart, and the worker's compensation rate (e.g., both a base compensation rate and any additional compensation data, such as whether assigning a task to the worker result in overtime or bonus pay).

A machine learning engine 115 trains a machine learning model 116 to predict the downstream effects associated with assigning a particular task to a particular worker. In some examples, one or more elements of the machine learning engine 115 may use a machine learning algorithm to train the machine learning model 116 using historical task scheduling data and worker performance data. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging, random forest, boosting, backpropagation, and/or clustering.

In an embodiment, a set of training data includes datasets and associated labels. The datasets are associated with input variables (e.g., worker qualifications, task parameters, historical records of tasks performed by workers, a quality score associated with a task performed by a worker) for the target model f. The associated labels are associated with the output variable (e.g., time required to perform downstream tasks by different workers at different work centers in a work environment) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

Based on the prediction by the ML model 116, the task configuration display engine 113 displays the predicted downstream effects of assigning a task to a particular worker 124. For example, the task configuration display engine 113 displays a Gantt chart with particular predicted times for completing tasks by the selected worker and other workers at different work centers in a work environment. In addition, the performance metric calculation engine 114 calculates performance metrics associated with the predicted downstream effects. For example, based on the ML model predictions, the task configuration display engine may display two worker-task assignment selection tiles corresponding to two workers. The first tile may display performance metrics: "utilization: 80%; on-time deliveries: 75%". The second tile may display performance metrics: "utilization: 70%; on-time deliveries: 80%". Based on detecting the administrator selecting the first tile, the task configuration display engine 113 displays a Gantt chart in which the task is assigned to a first worker. The Gantt chart displays the ML model-predicted downstream effects to tasks performed at different work centers based on assigning the task to the first worker. Based on detecting the administrator selecting the second tile, the task configuration display engine 113 displays a Gantt chart in which the task is assigned to a second worker. The Gantt chart displays the ML model-predicted downstream effects to tasks performed at different work centers based on assigning the task to the second worker. The task GUI 118 may include a task-assignment confirmation button to allow the administrator to confirm assignment of a task to a particular worker. Based on the assignment, the work environment management platform 110 generates a set of instructions to assign the task to the particular worker. The instructions may also include assignments of other tasks to other workers. For example, when assigning a particular task to a particular worker necessitates offloading other tasks that were assigned to the particular worker, the instructions may include assignments of the other tasks to other workers.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may be executed on the same computing system as the work environment management platform 110. Alternatively, or additionally, a data repository 130 may be implemented or executed on a computing system separate from the work environment management platform 110. A data repository 130 may be communicatively coupled to the work environment management platform 110 via a direct connection or via a network.

Information describing a set of tasks available to be performed in a work environment 120, task schedule metrics 132, worker data 133, material data 134, equipment data 135, and historical task schedule data 136 may be implemented across any of components within the system 100. However, this information is illustrated within the data repository 130 for purposes of clarity and explanation.

In one or more embodiments, the work environment management platform 110 refers to hardware and/or software configured to perform operations described herein for recommending and implementing task schedules for a work environment. Examples of operations for recommending and implementing task schedules for a work environment are described below with reference to FIG. 2.

Figure 2B:
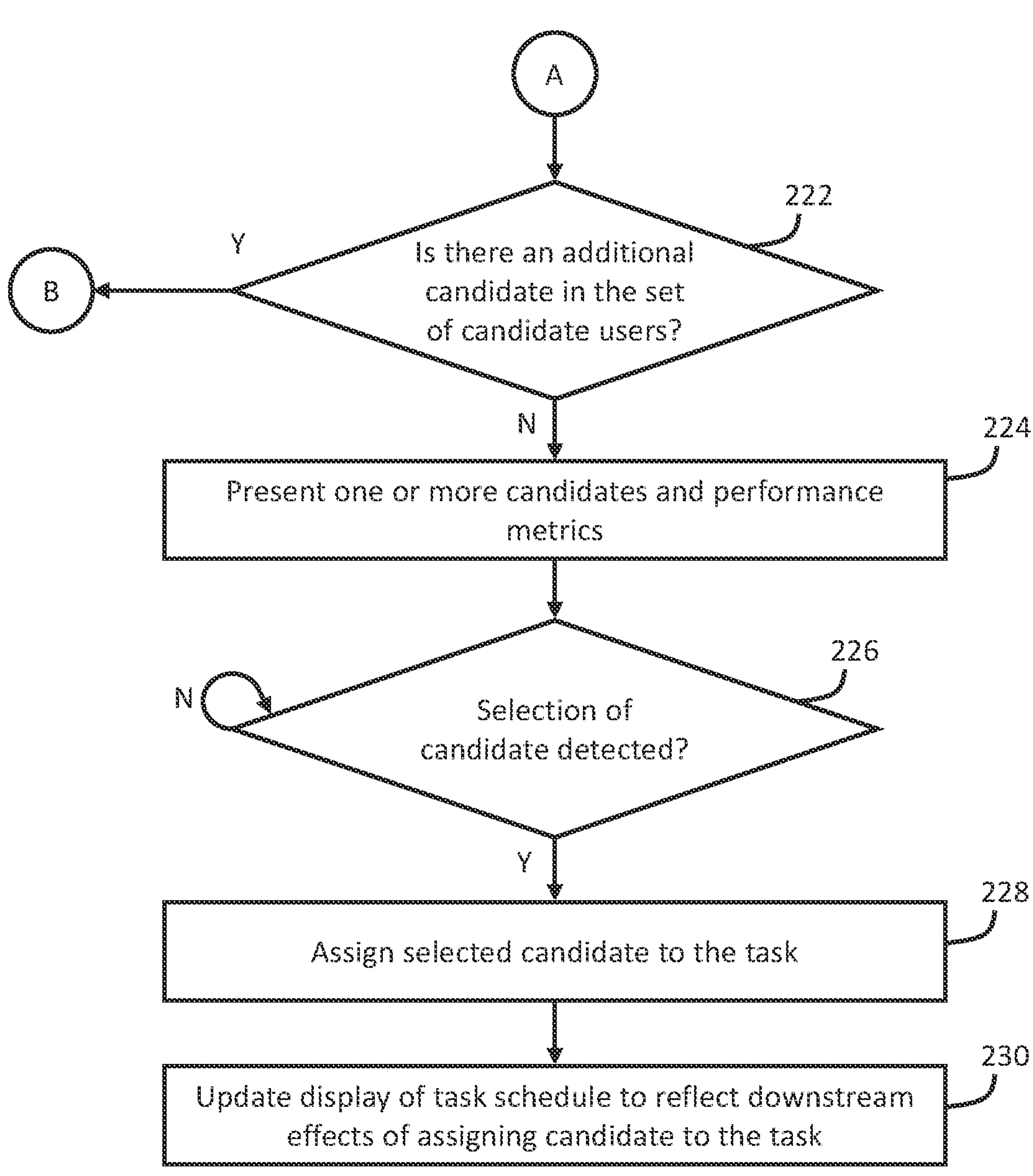

3. Generating Predictions for Downstream Effects of Task Assignments to Users FIGS. 2A and 2B illustrate an example set of operations for reordering of work center tasks in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system identifies a set of task parameters associated with a task to be performed by one or more users at one or more work centers in a work environment (Operation 202). Task parameters include: equipment required to perform a task, equipment that may need to be operated on to perform the task, such as equipment that is in a fault state, materials needed to remediate a fault, and user qualifications required to remediate the fault.

For example, a task may include assembling a component. The task parameters may include: (a) sub-components required for the assembly, (b) a machine required to solder together the subcomponents, and (c) user qualifications indicating proficiency with operating the machine.

According to another example, a work environment monitoring platform may identify a fault in a piece of equipment in the work environment. The system may generate a task to remediate the fault. The task parameters may include: (a) the equipment that is in a faults state, (b) tools or equipment required to remediate the fault, and (c) user qualifications indicating proficiency with the equipment that is in the fault state and the tools required to remediate the fault.

According to one embodiment, the system identifies the task parameters for the task in response to a triggering event. For example, the task may have been assigned to a user or pool of potential users who subsequently became unavailable to perform the task. According to an alternative example, the task may be a newly created task. For example, upon detecting a fault in a work environment, the system may generate a new task and determine the task parameters for the new task. According to yet another example, the task may be an existing task in a task management system, and a manager or administrator may interact with a user interface to change the assignment of the task from one user or pool of users to a different user.

The system determines whether the task parameters match a user's qualifications (Operation 204). According to one embodiment, the system accesses a database to retrieve a user's qualifications. The qualifications may be defined as a function of one or more of: certifications, work history, training, education, and any other expertise recorded in the database.

If the task parameters to not match the user qualifications for any user identified in the database, the system may either (a) refrain from assigning the task to the user, or (b) identify one or more substitute task parameters and/or user qualifications for assigning the task (Operation 206). According to one example embodiment, if the system refrains from assigning the task to a user, the system may generate a notification to an administrator flagging the task for administrator attention. The administrator may then determine whether to assign the task to a user or modify the task parameters. The system may provide the administrator with a visual representation of available workers and/or a visual representation of recommended task requirements. The system may display in a GUI a field for the administrator to select from among the available workers to assign to the task.

According to one or more embodiments, identifying substitute task parameters for a task may include applying the task parameters to a machine learning model to identify one or more alternative task parameters for the task. For example, when the system identifies a task for which the system does not detect a match between recommended qualifications and user qualifications, the system applies a set of task parameters to a machine learning model to identify a user, or a pool of candidate users, to whom to assign the task. The machine learning model may learn a relationship between a task description and terms in a user profile, historical tasks performed by users, educational information associated with a user, or a user's training. A system may determine that a machine "M100" requires maintenance. However, no user may have qualifications including the "M100" model. For example, searching user experience, training, and work history in a database may return no results for "M100." The machine learning model may learn during training that a user qualified to perform maintenance on a "P300" model has a high success rate servicing "M100" models. Accordingly, the machine learning model may generate a recommended qualification including the term "P300." When the system searches the database for "P300," the system identifies at least three workers who may be qualified to perform maintenance on the M100 model. Accordingly, the system adds a new task to a task management platform to perform maintenance on the M100 machine including the user qualification "P300 maintenance." As another example, the machine learning model may learn that a particular manager relies on a particular user to perform maintenance on each machine in the manager's organization with a high success rate. Accordingly, the machine learning model may generate a recommended user qualification for a particular task including either the user's name or other identifying information, such as "Section B, employee type: service technician."

Based on determining that one or more users' qualifications match the recommended user qualifications for performing the task, the system matches the task to the users (Operation 208). For example, the system may store in a database one or more tables representing tasks. The system may store user identification information in the table associated with the tasks that match the respective users' qualifications.

The system selects a candidate user from among a set of candidate users associated with a particular task (Operation 210). According to one embodiment, the system selects the candidate user in response to a triggering event (such as the triggering event described above in connection with Operation 202). For example, the task may have been assigned to a user or pool of potential users who subsequently became unavailable to perform the task. According to an alternative example, a manager or administrator may interact with a user interface to change the assignment of the task from one user or pool of users to a different user. In the embodiment in which the system stores a data object representing the task in a database, the system may obtain identification information for the candidate from a particular field in the data object.

The system applies a trained machine learning model to task schedule data and the user data to predict downstream effects of assigning the task to the candidate user to perform (Operation 212). Downstream effects include costs associated with assigning the task to the candidate user and benefits derived from assigning the task to the candidate user. Examples of downstream effects include: usage of equipment at a work center based on a user either (a) performing the task at the work center, or (b) being moved to another work center to perform a task on equipment at the other work center; usage of materials based on (a) the user performing the task using the materials, or (b) the user performing a task that does not require the materials, which the user may have used had the task not been assigned to the user; delay in a set of tasks that the user would have performed had the user not been assigned the task; delay (or an improvement in execution time) for a set of tasks that depend from the task assigned to the user; modifications to the user's availability to perform other tasks; modifications to the availability of equipment based on the user being assigned the task; and modifications to the availability of materials based on the user being assigned the task. The machine learning model receives as input, not just a user's identity, but user attributes (including attributes such as expertise with particular equipment, success rates in performing tasks historically, a degree of similarity between task parameters and user qualifications, and equipment attributes, such as a location and type of equipment affected by a task assignment to a user).

Some downstream effects may be measured by performance metrics. The performance metrics include quantitative measurements of the performance of one or more of (a) workers, (b) work centers, and/or (c) a work environment. Examples of performance metrics include a utilization rate—or a percentage of time that a piece of equipment is in use—for a particular work center and/or across the entire work environment, task completion times for particular tasks, on-time delivery statistics, efficiency statistics, cost-estimate statistics, and/or overall equipment effectiveness (OEE) statistics for a worker, work center, and/or the work environment. Accordingly, the system may calculate one or more performance metrics based on assigning the task to the user.

According to one example, a machine learning model learns that for a particular worker there is a correlation between a particular and a particular piece of equipment. Based at least in part on the correlation, the machine learning model may predict a set of downstream effects from assigning a task corresponding to the equipment to the worker, including (a) an increase in productivity from work center in which the equipment is located, and (b) a decrease in productivity from the worker's regular work center. The machine learning model may further predict that for a different worker, there would also be an increase in productivity from the work center in which the equipment is located, but the increase would be less than with the first worker, based at least in part on a reduced historical success rate for the latter worker.

According to another example, the machine learning model predicts that assigning a task to a particular worker results in: (a) a time delay for the worker to move from one work center to another to perform the task, (b) a product-output delay for a set of components the worker would assemble in a set of corresponding component-assembly tasks, and (c) a product-output improvement for components output from the work center to which the worker is moved to perform the task, based on the worker reconfiguring a piece of equipment. The system may predict a reduced efficiency performance metric for the worker, corresponding to time predicted for the worker to reconfigure equipment at the new work center during which the worker would not be assembling components at the worker's original work center. The system may predict an improved efficiency performance metric for the work center at which the worker reconfigured the equipment. The system may further predict an overall improved on-time delivery performance metric for the work environment including the two work centers, based on the worker's reconfiguration of the equipment.

The system determines if the calculated performance metrics meet a threshold (Operation 216). For example, the system may apply a set of rules that specify a task should only be associated with a user if the resulting pair would correspond to an improvement in an OEE performance metric or an improvement in on-time deliveries across a work environment. As another example, the system may apply a set of rules that specify a task should only be associated with a user if the resulting pair would correspond to the same, or an improved, equipment utilization performance metric, when compared with the equipment utilization performance metric prior to assigning the task to the user.

If the system determines that the predicted performance metrics do not meet the threshold, the system may not store the candidate/task pair (Operation 218). On the other hand, if the system determines that the predicted performance metrics meet the threshold, the system stores the candidate/task pair (Operation 220).

The system determines if there is an additional candidate among the set of candidate users (Operation 222). If there are no additional candidates, the system presents one or more candidates and corresponding performance metrics for selection by a user in a graphical user interface (GUI) (Operation 224).

The system detects whether a selection is made in association with the task (Operation 226). For example, an administrator may access a user interface that gives the administrator the ability to match users to tasks. The system may detect the administrator selecting a user for a task. For example, the administrator may interact with a button and/or fields in a GUI to select or drag-and-drop an element representing a user to assign the user to an element representing a task.

According to an alternative embodiment, the system detects a selection without any action from an administrator. For example, a worker logs into a terminal at a work center to obtain a set of tasks that the worker may perform at the work center. Logging in may include manually entering a user identification, swiping a user identification card, or detecting a user's identification via a facial recognition application. The worker may be among a pool of candidate users with qualifications matching the recommended user qualifications corresponding to the task. The system may analyze the set of tasks available for the worker to perform at the work center. Based on determining the worker is among a set of candidate users who may perform the task, the system may select, without further user intervention, the user from among the set of candidate users to pair with the task. If another worker from the pool of users logs in to their work center after the system has assigned the task to the worker, the system may refrain from selecting the subsequent worker to perform the task.

Based on a selection of a candidate user to perform a task, the system assigns the selected candidate to the task (Operation 228). For example, if a system detects an administrator's selection of a particular user to perform a particular task, the system assigns the task to the user in a task management system. When the user logs in to a terminal at a work center, the task appears in a display for the user to perform. When other candidate users log in to work terminals, the task does not appear as an option for the other candidate users to perform.

In an example embodiment in which the system assigns the task to a pool of candidate users with qualifications matching the recommended user qualifications for the task, the system may assign the task to the first candidate user who logs in to a work center terminal and/or selects the task from among a set of available tasks to perform. For example, if a first candidate logs in to a work center terminal first, the system may assign the task to the first candidate user. If a second candidate logs in to the work center terminal after the first candidate, the system may not display the task as being available for the second candidate to perform. On the other hand, if the second candidate signs in to a terminal prior to the first candidate, the system may assign the task to the second candidate. The system may then refrain from displaying the task as being available for the first candidate when the first candidate signs in to a work center terminal.

The system updates a display representing a task schedule of task to be performed in a work environment to reflect downstream effects of assigning the task to the candidate (Operation 230). For example, the system may display for an administrator a Gantt chart illustrating work centers in a work environment and tasks to be performed at the work centers. The representation of tasks performed at the work centers takes into consideration which worker is assigned to work at each work center. Based on detecting the assignment of a particular task to a particular worker, the system updates the display representing the task schedule to reflect the assignment. For example, if the task assignment includes moving the worker between two work centers, the system modifies the display to illustrate a change in time for completing tasks at the two work centers based on the change in workers assigned to complete the tasks. If a task assignment includes inserting a task into a worker's queue of tasks at a work center, then the system modifies the display to illustrate a change in time for completing the tasks at the work center. The system may further recommend offloading one or more tasks to other workers at other work centers.

According to one embodiment, the system displays a graphical user interface including one or more worker-task assignment selection tiles corresponding to one or more workers that a user may select for performing a task. The system may display a representation of a work environment in one region of a graphical user interface and the worker-task assignment selection tiles in another region. For example, the worker-task assignment selection tiles may be located above, below, or to a side of the representation of the work environment. The system may apply a trained machine learning model to determine which worker-task assignment selection tiles to display. Input features for the machine learning model include historical task manager selections associated with different configurations of tasks performed by workers at work centers.

A user may interact with a user interface element in a GUI to indicate selection of a worker-task assignment selection tile. Responsive to detecting a selection, the system modifies a GUI to display the predicted downstream effects of assigning a particular task to a particular worker. The system may display a Gantt chart with rows representing work centers and line segments or rectangles along the rows representing tasks to be completed at the work centers. The system may display a set of tasks in a source work center with a first set of display characteristics to distinguish among (a) tasks that would be unchanged (i.e., performed at a same time in a same work center) in both the source task configuration and the target task configuration, and (b) tasks that would be modified (i.e., performed at a different time, at a different work center, or both) in the target task configuration.

For example, the system may show a set of tasks that would be modified between a source configuration (e.g., prior to assigning a task to a particular worker) and a target configuration (e.g., after assigning a task to a particular worker) as (a) greyed out boxes in a source work center row at a source time, and (b) highlighted boxes at a target work center row at a target time. The system may alter the appearance of tasks in a representation of a target configuration to indicate a change in task characteristics. For example, moving a worker from one work center to another work center to perform a particular task may result in a set of tasks taking longer to perform in the target work center. The system may lengthen a visual representation of the tasks in the target work center to indicate the estimate for the difference in time required to perform the tasks between the source work center/time and the target work center/time. In addition, or in the alternative, moving a worker from one work center to another may result in a set of tasks, which is performed subsequent to the assigned task, taking a shorter amount of time to complete in the target work center than they would have taken if the task at the target work center had not been assigned to the worker. The system may shorten a visual representation of the tasks in the target work center to indicate the estimate for the difference in time required to perform the tasks between the source work center/time and the target work center/time. The visual depictions of a difference in time required to complete tasks in an alternate task schedule may include visual representations of graphical elements without corresponding text. Alternatively, the visual representations may include text indicating a change in time required to complete tasks.

Assigning a task to a particular worker may require lead time to reconfigure equipment at the worker's work center. Accordingly, the system may display an additional task in a portion of the GUI representing the target work center corresponding to a time required to calibrate equipment at the target work center to perform the assigned task. Similarly, assigning the task to the worker may require redirecting materials from another location to a target work center. Redirecting the materials may result in congestion within a work environment. Accordingly, the system may modify the start time of tasks in the target work center to account for a delay caused by the predicted congestion in the work environment. In addition, the system may display in a visual representation of the work environment in the GUI, a depiction of a location of the predicted congestion.

The system may modify a display of tasks performed in a work center responsive to receiving selections of different worker-task assignment selection tiles. For example, selecting one worker-task assignment selection tile may result in one preview of the downstream effects of the task assignment on tasks performed in the work environment. An administrator may then select a different worker-task assignment selection tile to view a different preview of a different set of downstream effects corresponding to the selected worker.

Based on receiving a selection confirming an assignment of a task to a particular user, the system generates and transmits instructions to work centers to implement a corresponding alternative task schedule. Generating instructions to implement the alternative task schedule includes modifying sets of tasks assigned to workers at workstations. For example, when a task is assigned to one worker, the system may reassign one of the worker's tasks to another worker. If the task requires the worker to move to a different work center, the system may reassign a different worker to move to the former worker's work center. The system may remove a set of tasks from a queue of tasks to be performed by one worker (to whom a task was assigned) at a first work center and may add the set of tasks to a queue of tasks to be performed by one or more workers at another set of work centers. If the worker(s) at the latter work centers had other tasks previously assigned to them, the other tasks may be either rescheduled to different times for the same worker(s) or transferred to another worker at another work center.

In some embodiments, when a user signs in to a work center terminal, the system provides the user with a set of available tasks for the user to perform. The system initiates a particular task based on the user selecting the task in the user interface, or based on detecting the user has begun performance of the task. In such an embodiment, the system may (a) detect a user has initiated a task, such as by detecting user movements in a video stream that correspond to an operation in the task, (b) assign the task to the user (and make the task unavailable to other users), and (c) modify a display to show operations to perform to complete the task and/or modify work center equipment to facilitate performance of the task.

In some alternative embodiments, when a user signs in to a work center terminal, the system analyzes a set of tasks available to the user based on the user qualifications and presents the user with the highest-ranked task among the available tasks. For example, one task may be to assemble a component at the work center. Another task may be to reset a configuration of a piece of equipment at the work center. The system may identify the latter task as having priority over the former task, based on the latter task having a greater effect on the on-time delivery performance metric for a particular product. Accordingly, the system may present the user with the latter task to perform. Upon completion of the repair, the system may then present the user with the component-assembly task to perform.

In some embodiments, the system modifies work center equipment based detecting a user has selected a task to perform. The system may record a task start time and a task end time. The system may turn on equipment, unlock equipment and/or materials, and modify a display of a user terminal to provide information for performing the task. The information may include step-by-step instructions, diagrams, deadline information, or any other information associated with the task. In one or more embodiments, the system generates a notification to another user when a task is initiated. For example, the system may identify a dependent task that cannot be performed prior to its parent task. When a user selects the parent task on the user terminal, the system may generate a notification to a user or set of users associated with the dependent task that the parent task has been initiated.

According to yet another example, the system may skip Operation 224 and assign a task to a particular candidate user from among a pool of candidate users without presenting candidates and/or performance metrics for a user's or administrator's consideration. For example, the system may apply a set of rules to prioritize assignments of tasks to users based on criteria, such as: user availability, user efficiency, user success rate, a percentage match of user qualifications to task parameters, a user experience level, user training qualifications or certifications, and an experience level of the user with a particular manager or a particular piece of equipment.

According to one embodiment, the system tracks the time that a user spends operating equipment. The system may store the tracked time in the employee database. The tracked time may be used towards completion of qualification with particular equipment or to demonstrate a particular level of experience the user has with the equipment.

4. Training a Machine Learning Model

Figure 3:
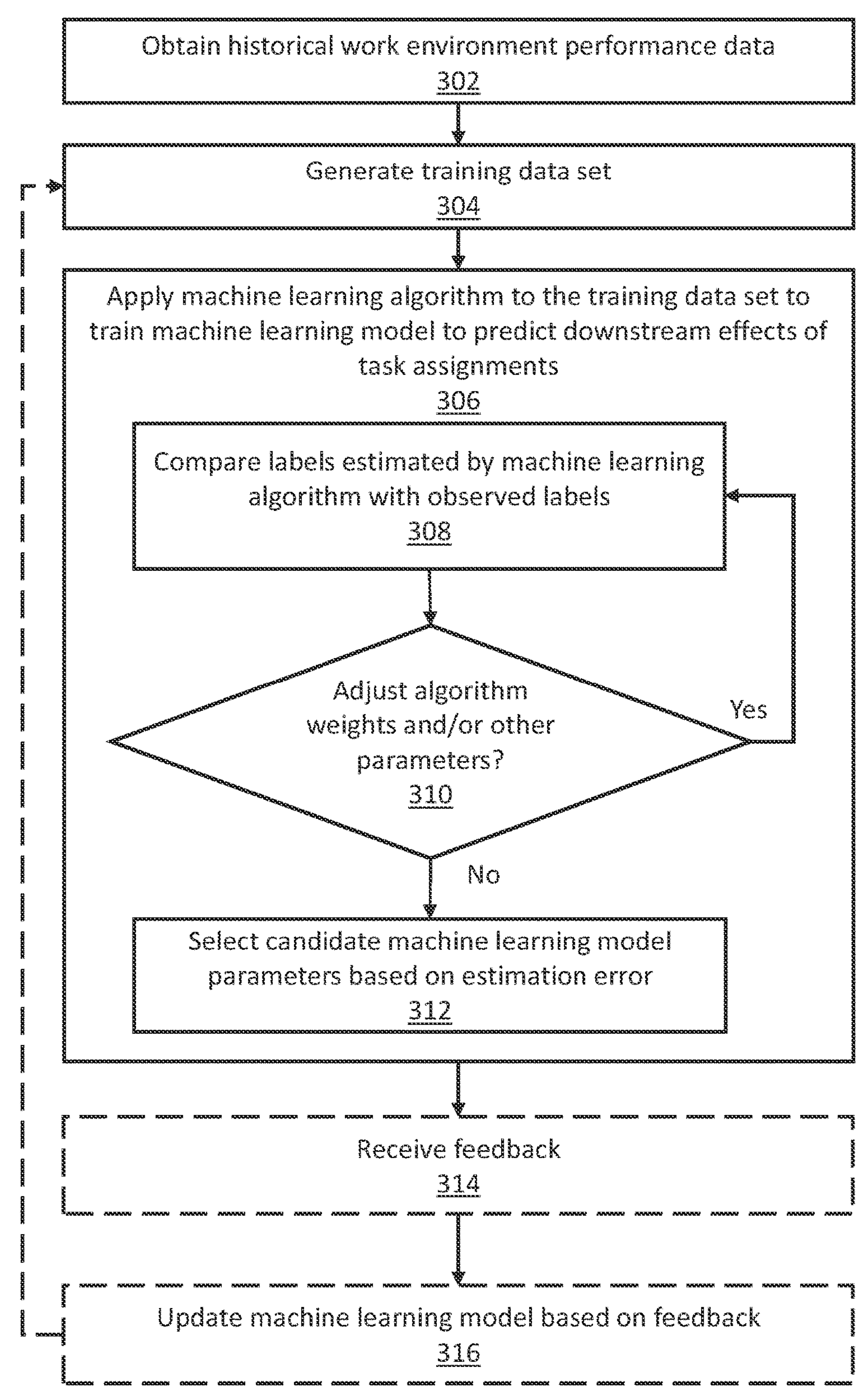
FIG. 3 illustrates an example set of operations for training a machine learning model to predict downstream effects of task assignments in accordance with one or more embodiments.

FIG. 3 illustrates an example set of operations for training a machine learning model to predict downstream effects of assigning tasks to users, in accordance with one or more embodiments. For example, when a system identifies a task to be performed, the system may generate predictions of how assigning the task to different users affects additional tasks performed by the same user and other users at a same work center and other work centers within a work environment. A system obtains historical work environment performance data (Operation 302). Historical work environment performance data includes: which users have performed specified tasks, equipment used to perform the tasks, work centers in a work environment where the tasks were performed, materials used to perform the tasks, user qualifications of the users who performed the tasks, supervisors of users, success rates (e.g., whether a task was successfully completed), and recidivism rates (e.g., whether task resolution actually closed the task, or whether the task had to be re-performed within a specified period of time).

Once the various data (or subsets thereof) are identified in Operation 302, the system generates a set of training data (operation 304). Training data may include (a) a set of tasks assigned to a respective set of users and/or work centers in a work environment, and (b) for each set of tasks, at least one label. Examples of labels include: user qualifications of the users who performed the tasks, equipment used to perform the task, work centers in a work environment where the task was performed, materials used to perform the task, information identifying supervisors, managers, or other employees associated with the task, and performance metrics, such as a time spent performing the task.

According to one embodiment, the system obtains the historical data and the training data set from a data repository storing labeled data sets. The training data set may be generated and updated by a work environment management platform. Alternatively, the training data set may be generated and maintained by a third party.

In some embodiments, generating the training data set includes generating a set of feature vectors for the labeled examples. A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include performance metrics for a task, an identity of a worker who performed the task, worker qualifications, worker schedules, equipment data, and materials data of materials used to perform tasks. In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each possible category in an original feature. In one-hot encoding, when one feature has a value of 1, the remaining features have a value of 0. For example, if a task attribute has ten different categories, the system may generate ten different features of an input data set. When one category is present (e.g., value "1"), the remaining features are assigned a value "0." According to another example, the system may perform label encoding by assigning a unique numerical value to each category. According to yet another example, the system performs binary encoding by converting numerical values to binary digits and creating a new feature for each digit.

The system applies a machine learning algorithm to the training data set (Operation 306). The machine learning algorithm analyzes the training data set to identify data and patterns that indicate relationships between input features, including user attributes of users who performed tasks, and downstream effects of the performance of the tasks on additional tasks in the work environment. Types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data.

In some embodiments, the system compares the labels estimated through the one or more iterations of the machine learning model algorithm with observed labels to determine an estimation error (Operation 308). The system may perform this comparison for a test set of examples, which may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted. In some embodiments, the system determines whether to adjust the weights and/or other model parameters based on the estimation error (Operation 310). Adjustments may be made until a candidate model that minimizes the estimation error or otherwise achieves a threshold level of estimation error is identified.

In some embodiments, the system selects machine learning model parameters based on the estimation error meeting a threshold accuracy level (Operation 312). For example, the system may select a set of parameter values for a machine learning model based on determining that the trained model has an accuracy level for predicting workers to be assigned to tasks of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given set of training data includes tasks that were historically performed by users and corresponding attributes (such as user qualifications, equipment used or operated on, and a time required to complete the task). Each task assigned to a worker may be processed as a separate discrete instance of time. For instance, a data set may include performed tasks $c_1$, $c_2$, and $c_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous expenses in the sequence of expenses. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of set of tasks to a cell's output may affect the contribution of the set of tasks in the cell's output. Thus, the contribution of $c_1$ may affect the contribution of $c_2$, etc. Accordingly, the model may learn a relationship between sequences of tasks performed by a user.

Additionally, or alternatively, the system may train other types of machine learning models. For example, the system may adjust the boundaries of a hyperplane in a support vector machine or node weights within a decision tree model to minimize estimation error. Once trained, the machine learning model may be used to recommend users or sets of users to perform tasks.

In examples of supervising ML algorithms, the system may obtain feedback on whether a particular set of downstream effects should be attributed to a particular assignment of a task to a user (Operation 314). The feedback may affirm a particular prediction of a downstream effect. In other examples, the feedback may indicate that a particular downstream effect should not be associated with a particular assignment of a task to a user. Based on the feedback, the machine learning training set may be updated, thereby improving its analytical accuracy (Operation 316). Once updated, the system may further train the machine learning model by optionally applying the model to additional training data sets.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
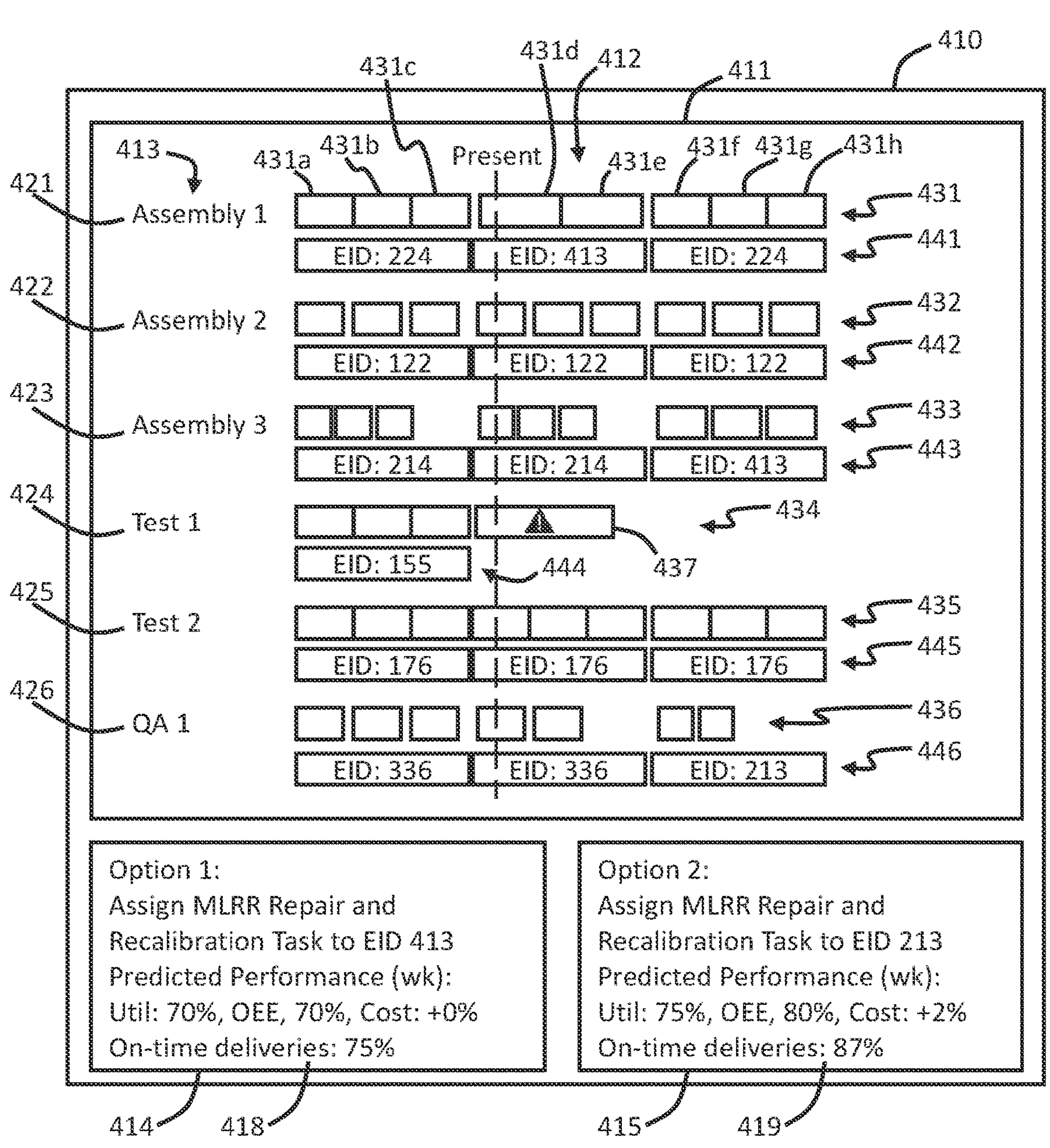
FIGS. 4A-4C illustrate an example embodiment for implementing qualification-based task management.
Figure 4B:
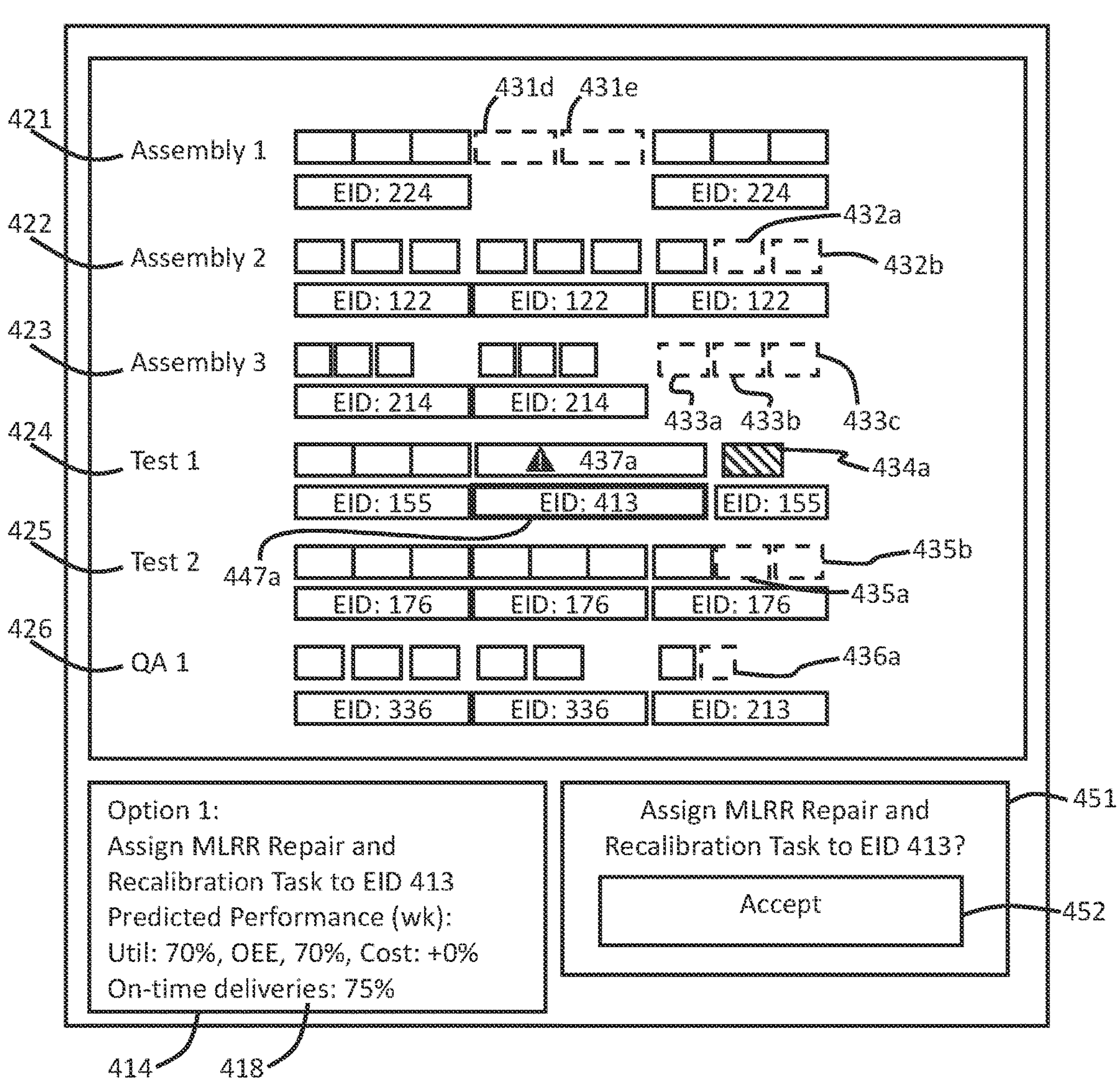
Figure 4C:
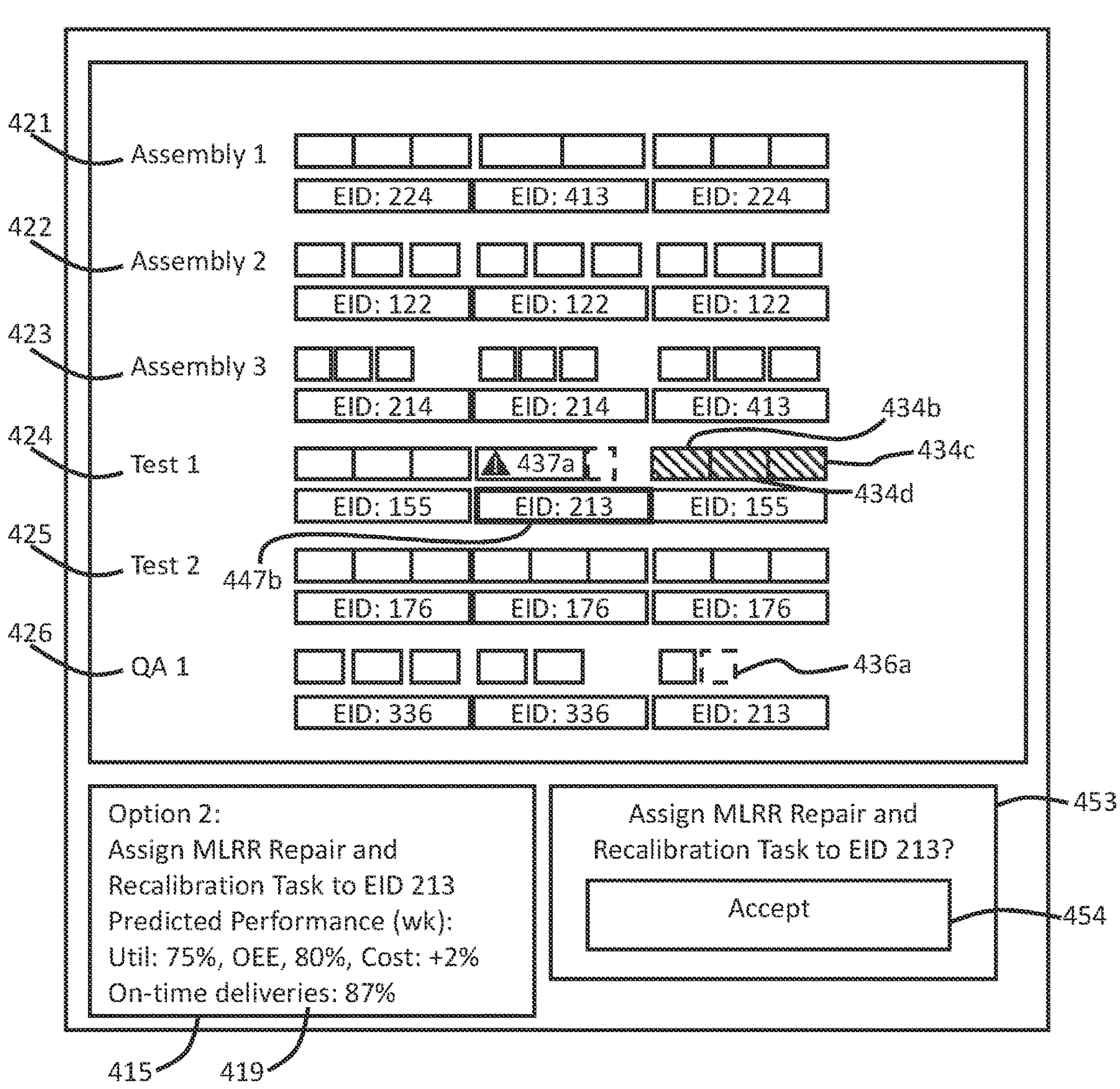

FIGS. 4A-4C illustrate graphical user interface displays for selecting users to assign to tasks and presenting predictions of downstream effects of the predictions on task schedules, according to one example embodiment.

As illustrated in FIG. 4A, a GUI 410 includes a Gantt chart 411 including tasks 412 scheduled to be completed at work centers 413 within a manufacturing facility. The chart 411 includes visual representations of tasks that are on-time, late, affected by faults in equipment, and rescheduled. For example, if performance of a task is affected by an equipment fault, the system may display the task in one color different from tasks that are unaffected by equipment fault. The chart 411 illustrates a row of tasks 431-436 which either have been performed, are in the process of being performed, or are scheduled or predicted to be performed at the work centers 421-426, respectively.

In the example embodiments illustrated in FIGS. 4A-4C, work center 421 is an assembly work center for assembling materials into components. Row 431 illustrates tasks, represented by rectangular shapes, which are performed by workers (or users or employees) identified in the row 441. For example, Rows 431 and 441 illustrate (a) three tasks 431*a*-431*c* which were performed by a worker with an employee ID number 224, a task 431*d* which is presently being performed by an employee with an EID 413, another task 431*e* which is scheduled to be performed by the employee with the EID 413, and then three more tasks 431*f*-431*h* which are scheduled to be performed by the employee with the EID 224. The chart 411 illustrates tasks 431*d* and 431*e* as having a longer lengthwise dimension than tasks 431*a*-431*c* based on predicting it will take longer for the employee with EID 413 to perform the tasks than it will take for the employee with EID 224 to perform the tasks. In other words, all of tasks 431*a*-431*h* are the same task to assemble a component. The system analyzes user profile data, including efficiency data and productivity data, to predict the time required to complete the task. Based on determining it would take the employee with the EID 413 longer to perform the tasks than the employee with the EID 224, the system modifies the visual attributes of the interface elements (e.g., rectangles) representing the tasks to reflect the difference in the predicted time to complete the tasks for the different users.

In the GUI 410 illustrated in FIGS. 4A-4C, the work centers 413 include assembly work centers 421-423 where workers assemble components, test-type work centers 424 and 425 where workers test the assembled components, and a quality assurance work center 426 where workers perform quality assurance checks on the tested components. In addition, the GUI 410 illustrated in FIGS. 4A-4C illustrates rows 441-446 depicting which workers have performed tasks/are performing tasks/are scheduled or predicted to perform tasks at the work centers 421-426. Multiple different workers may work at the same work center. FIGS. 4A-4C illustrate one worker working at a work center at a time. However, embodiments encompass multiple workers being able to work at a work center at the same time. For example, some tasks may require two or more workers to complete. Other work centers may have space for two workers to work at different pieces of equipment concurrently. In addition, one or more embodiments track which workers are scheduled or predicted to work at work centers without displaying the particular workers in the GUI 410. When the system detects different users being associated with a work center, the system analyzes the user attributes, such as user performance metrics (e.g., how productive is the worker, and what is the worker's experience level with the equipment at the work center) to determine (a) which tasks will be performed at the work center, and (b) how long will it take the worker to perform the tasks. For example, the system may predict or schedule one worker to perform a sequence of tasks A, B, and C at a work center. The system may predict or schedule another worker to perform the same task, A, A, A, repeatedly at the work center. The system may predict one user will take 15 minutes to perform task A. The system may predict another user will take 30 minutes to perform task A.

In the example illustrated in FIGS. 4A-4C, the GUI 410 includes a task 437 representing the repair and recalibration of a piece of equipment at the test work center 424. For example, the system may detect a fault in the equipment, generate a task to repair the equipment, and generate a representation of the task 437 in the GUI 410.

The system generates recommendations for assigning the task 437 to workers. The system further applies a machine learning model to predict the downstream effects of assigning tasks to workers. The system displays two tiles 414 and 415 corresponding to two options for assigning the task 437 to workers. According to option 1 (tile 414), the system assigns the task to the worker with EID 413. According to option 2 (tile 415), the system assigns the task to the worker with EID 213. A user may select a tile associated with an option to see how the option would affect the scheduled tasks among all the work centers. In addition, the user may further customize the rescheduling of tasks by selecting and moving individual tasks, sets of tasks, and workers in the GUI 410.

The system displays in the tiles 414 and 415 predicted performance metrics 418 and 419 associated with the respective options. For example, the system predicts option 1 (tile 414) would result in a utilization rate of 70%, an OEE of 70%, no cost increase, and an on-time delivery rate of 75%. The system predicts option 2 (tile 415) would result in a utilization rate of 75%, an OEE of 80%, no cost increase, and an on-time delivery rate of 87%. While FIG. 4A illustrates an example in which tiles 414 and 415 include a same set of performance metrics, in one or more embodiments, the system displays tiles with different performance metrics and/or with costs associated with assigning a task to different users.

As illustrated in FIG. 4B, when a user selects a tile 414 associated with assigning the task 437*a* to a worker with the EID 413, the system modifies the GUI 410 to provide the user with a preview of the modification. FIG. 4B shows a bar 447*a* indicating the worker with the EID 413 has been selected to be assigned to perform the task 437*a*. The system displays the downstream effects of assigning the task 437*a* to the worker with the EID 413, including: tasks 431*d* and 431*e* may not be performed at work center 421 (as a result of worker with EID 413 being unavailable to perform the tasks), tasks 432*a* and 432*b* may not be performed at work center 422 (as a result of tasks 431*d* and 431*e* not being performed to assemble components required for tasks 432*a* and 432*b*), tasks 433*a*-433*c* being unable to be performed (as a result of the unavailability of the worker with EID 413), task 434*a* being performed (as a result of completion of the task 437*a*), tasks 435*a* and 435*b* being unable to be performed (as a result of the failure to perform tasks 433*a*-433*c*), and task 436*a* being unable to be performed (as a result of the downtime of work center 424 during the repair and recalibration task 437*a*). The system displays in the GUI 410 a confirmation window 451, including a task-assignment confirmation button 452, to allow a user to accept a displayed task assignment to the corresponding user (e.g., worker with EID 413).

As illustrated in FIG. 4C, when a user selects a tile 415 associated with assigning the task 437*a* to the worker with the EID 213, the system modifies the GUI 410 to provide the user with a preview of the modification. FIG. 4C shows a bar 447*b* indicating the worker with the EID 213 has been selected to be assigned to perform the task 437*a*. The system displays the downstream effects of assigning the task 437*a* to the worker with the EID 213, including: tasks task 434*b*-434*d* being performed (as a result of completion of the task 437*a*). In FIG. 4C, the GUI 410 displays the task 437*a* shortened relative to FIGS. 4A and 4B, representing the system prediction, based on user attributes indicating the user has a high proficiency with the MLRR machine and the user has a high productivity rating, that the user will complete the task ahead of an average completion time. The system further displays in the GUI 410 a representation of task 436*a* indicating the task is unable to be performed (as a result of the downtime of work center 424 during the repair and recalibration task 437*a*). The system displays in the GUI 410 a confirmation window 451, including a task-assignment confirmation button 452, to allow a user to accept a displayed task assignment to the corresponding user (e.g., worker with EID 413).

Based on receiving a user input selecting the button 454, the system assigns the task to worker with EID 213. The system may send a notification to the worker, such as a voice message or text message, indicating the assignment. Alternatively, the system may notify the worker of the assignment to the task at the work center 424 when the worker logs in to any of the work centers 421-426.

While FIGS. 4A-4C illustrate an example embodiment in which a user or administrator assigns tasks to users using a GUI, one or more embodiments assign tasks to users without using the GUI. For example, a system may apply a set of predefined rules to identify a set of workers who are (a) qualified to perform a task and (b) authorized to perform the task. The system may apply a machine learning model to worker attribute data and scheduling data to predict downstream effects of assigning the task to each of the workers, respectively. Based on the predicted downstream effects, the system calculates corresponding predicted performance metrics for the respective assignments to the respective workers. The system compares the predicted performance metrics for the workers to defined thresholds to generate a subset of candidate workers two whom the system may assign the task. If the system detects any one of the candidate workers logging in to a work center terminal, the system may assign the task to the candidate worker, without intervening user or administrator input.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources.

Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use the same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with the same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
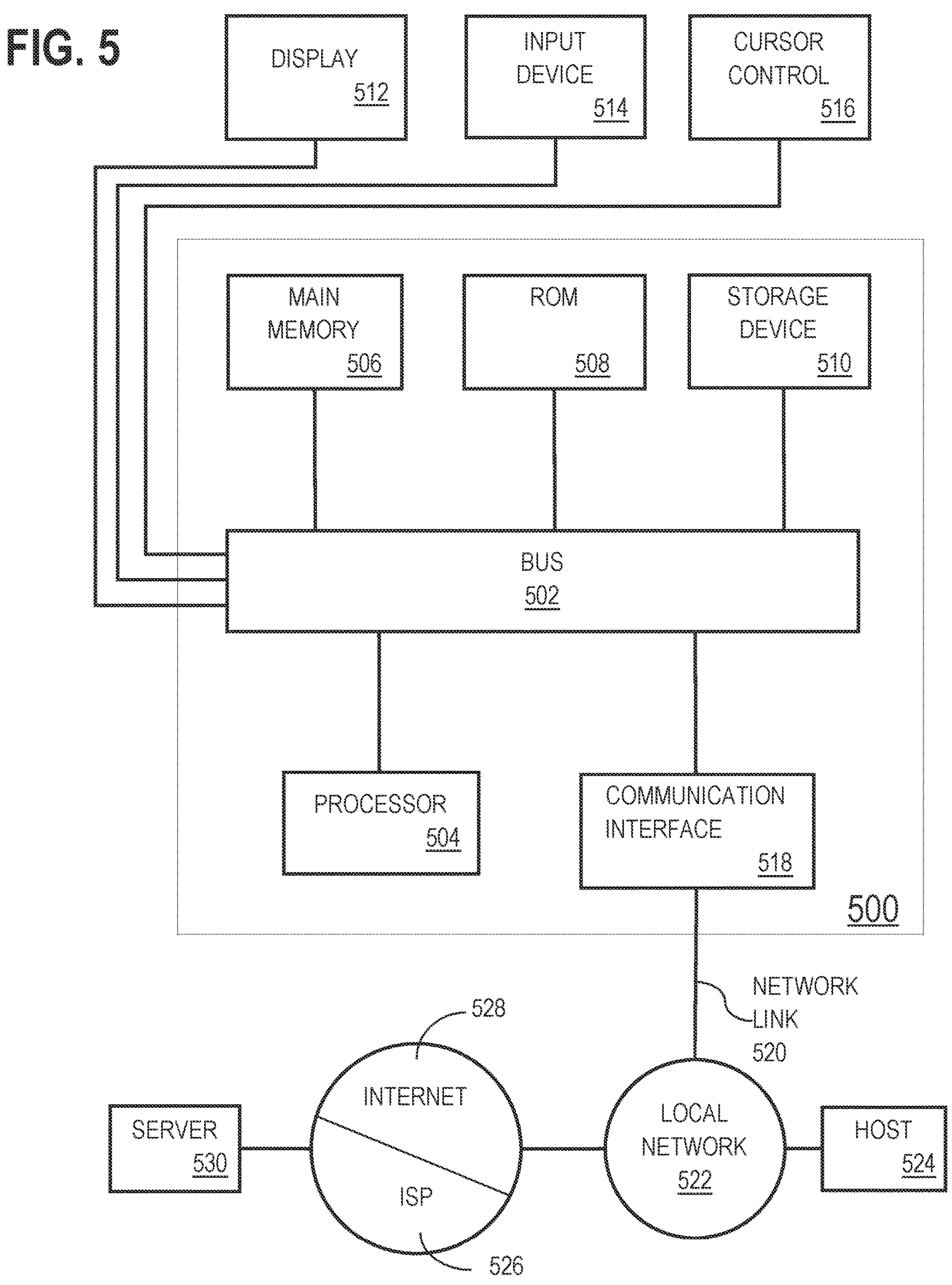
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

training a machine learning model to predict downstream effects of assigning tasks to users, the training comprising:

obtaining training datasets, each training dataset comprising:

historical task schedule data describing tasks performed at work centers by users;

historical user data of users performing the tasks at the work centers, the historical user data including: historical user qualifications, historical work history data, historical task completion success rates, and historical time to complete the tasks;

applying the training datasets to the machine learning model to generate an initial set of predictions;

comparing the initial set of predictions to labels; and retraining the machine learning model to adjust parameters of the machine learning model based on differences between the initial set of predictions and the labels;

identifying, by a work environment management engine, a first task corresponding to a first set of task parameters, the first set of task parameters including at least: a piece of equipment associated with performance of the first task and a first set of user qualifications recommended for performing the first task;

comparing, by the work environment management engine, the first set of user qualifications to a plurality of sets of user qualifications corresponding to a plurality of users;

responsive to comparing the first set of user qualifications to the plurality of sets of user qualifications corresponding to the plurality of users: identifying, by the work environment management engine, a first user with user qualifications that match the first set of user qualifications recommended for the first task;

retrieving, by the work environment management engine, first task performance information for the first user, the first task performance information comprising at least one of (a) scheduling information, and (b) historical task-completion information for the first user;

based on the first task performance information: generating, by the work environment management engine, a first candidate task schedule for a first workstation that includes assignment of the first task to the first user at the first workstation; and applying, by the work environment management engine, the machine learning model to the first candidate task schedule to predict a first downstream effect of assigning the first task to the first workstation, wherein the first downstream effect comprises an effect on the performance of one or more tasks in a second task schedule, wherein the first downstream effect comprises a first modification to the second task schedule, and wherein predicting the first downstream effect comprises predicting, based on the assignment of the first task to the first user at the first workstation, a change in a completion time of one or more tasks assigned to a second workstation that is different from the first workstation; and responsive to predicting the first downstream effect of assigning the first task to the first workstation:

determining, by the work environment management engine, if the performance of the one or more tasks in the second task schedule meets a performance threshold; and based on determining the performance of the one or more tasks in the second task schedule meets the performance threshold:

transmitting instructions to a first workstation computing device to modify a task queue of the first workstation to include the first task, wherein the first workstation computing device presents the first task for execution at the first workstation based on detecting completion of a preceding task in the task queue.

2. The non-transitory computer readable medium of claim 1, wherein the first task performance information includes at least one of:

scheduling information for the first user, including one or more tasks assigned to the first user, times when the first user is available to perform tasks, a success rate of the first user based on previously-completed tasks, and a productivity of the first user corresponding to an amount of time it takes the first user to complete tasks.

3. The non-transitory computer readable medium of claim 1, wherein applying the machine learning model to the first candidate task schedule further comprises:

applying the machine learning model to a set of input data including the first candidate task schedule and at least one of:

equipment characteristics for (a) equipment required to perform the first task, and (b) one or more sets of equipment corresponding to one or more work centers corresponding to a performance of one or more additional tasks in the second task schedule; and material characteristics for (a) materials required to perform the first task, and (b) one or more sets of materials corresponding to the performance of the one or more additional tasks in the second task schedule.

4. The non-transitory computer readable medium of claim 1, wherein the operations further comprise:

generating, in a graphical user interface (GUI), a first digital representation of the second task schedule; and modifying the first digital representation of the second task schedule to include an interface element representing the first task to generate a second digital representation of a third task schedule including the first task, wherein the second digital representation depicts the first task in association with the first user.

5. The non-transitory computer readable medium of claim 1, wherein the second task schedule comprises a first configuration of a set of tasks to be performed at a plurality of work centers in a work environment, wherein predicting the first downstream effect of assigning the first task to the first user comprises predicting a delay in performing one or more tasks in the second task schedule resulting from including the first task in the second task schedule.

6. The non-transitory computer readable medium of claim 1, wherein the operations further comprise:

responsive to comparing the first set of user qualifications to the plurality of sets of user qualifications corresponding to the plurality of users: identifying a filtered set of users, including the first user, with user qualifications that match the first set of user qualifications recommended for the first task, wherein applying the machine learning model to the first candidate task schedule for the first user is performed responsive to detecting a selection of the first user from among the filtered set of users.

7. The non-transitory computer readable medium of claim 6, wherein the operations further comprise:

displaying in a graphical user interface (GUI) a first task-assignment selection tile corresponding to the first user and a second task-assignment selection tile corresponding to a second user among the filtered set of users, wherein detecting the selection of the first user from among the filtered set of users includes detecting a user interaction with the first task-assignment selection tile.

8. The non-transitory computer readable medium of claim 6, wherein detecting the selection of the first user from among the filtered set of users includes detecting a first login by the first user to first terminal running a task management application prior to detecting any login of any other user among the filtered set of users into any terminal running the task management application.

9. The non-transitory computer readable medium of claim 1, wherein the operations further comprise:

responsive to comparing the first set of user qualifications to the plurality of sets of user qualifications corresponding to the plurality of users: identifying a second user with user qualifications that match the first set of user qualifications recommended for the first task;

retrieving second task performance information for the second user;

based on the second task performance information: generating a second candidate task schedule for the second user that includes assignment of the first task to the second user; and applying the machine learning model to the second candidate task schedule to predict a second downstream effect of assigning the first task to the second user, wherein the second downstream effect comprises an effect on a performance of one or more tasks in the second task schedule, wherein the second downstream effect comprises a second modification to the second task schedule.

10. The non-transitory computer readable medium of claim 1, wherein the operations further comprise:

detecting a fault in a work environment; and responsive to detecting the fault: generating a set of task parameters for a new task, wherein the set of task parameters includes the first set of user qualifications to perform the new task, wherein comparing the first set of user qualifications to a plurality of sets of user qualifications corresponding to a plurality of users is performed responsive to generating the set of task parameters for the new task.

11. The non-transitory computer readable medium of claim 1, wherein the machine learning model comprises a plurality of cells storing (a) model parameters and (b) memory storing task data, wherein applying the training datasets to the machine learning model to generate an initial set of predictions comprises:

generating an output from a first cell among the plurality of cells based on (a) a first set of model parameters, (b) first task data corresponding to a first task performed in a first period of time, the first task data stored in first memory in the first cell, and (c) second task data corresponding to a second task performed subsequent to the first task.

12. A method comprising:

training a machine learning model to predict downstream effects of assigning tasks to users, the training comprising:

obtaining training datasets, each training dataset comprising:

historical task schedule data describing tasks performed at work centers by users;

historical user data of users performing the tasks at the work centers, the historical user data including: historical user qualifications, historical work history data, historical task completion success rates, and historical time to complete the tasks;

applying the training datasets to the machine learning model to generate an initial set of predictions;

comparing the initial set of predictions to labels; and retraining the machine learning model to adjust parameters of the machine learning model based on differences between the initial set of predictions and the labels;

identifying, by a work environment management engine, a first task corresponding to a first set of task parameters, the first set of task parameters including at least: a piece of equipment associated with performance of the first task and a first set of user qualifications recommended for performing the first task;

comparing, by the work environment management engine, the first set of user qualifications to a plurality of sets of user qualifications corresponding to a plurality of users;

responsive to comparing the first set of user qualifications to the plurality of sets of user qualifications corresponding to the plurality of users: identifying, by the work environment management engine, a first user with user qualifications that match the first set of user qualifications recommended for the first task;

retrieving, by the work environment management engine, first task performance information for the first user, the first task performance information comprising at least one of (a) scheduling information, and (b) historical task-completion information for the first user;

based on the first task performance information: generating, by the work environment management engine, a first candidate task schedule for a first workstation that includes assignment of the first task to the first user at the first workstation; and applying, by the work environment management engine, the machine learning model to the first candidate task schedule to predict a first downstream effect of assigning the first task to the first workstation, wherein the first downstream effect comprises an effect on the performance of one or more tasks in a second task schedule, wherein the first downstream effect comprises a first modification to the second task schedule, and wherein predicting the first downstream effect comprises predicting, based on the assignment of the first task to the first user at the first workstation, a change in a completion time of one or more tasks assigned to a second workstation that is different from the first workstation; and responsive to predicting the first downstream effect of assigning the first task to the first workstation:

determining, by the work environment management engine, if the performance of the one or more tasks in the second task schedule meets a performance threshold; and based on determining the performance of the one or more tasks in the second task schedule meets the performance threshold:

transmitting instructions to a first workstation computing device to modify a task queue of the first workstation to include the first task, wherein the first workstation computing device presents the first task for execution at the first workstation based on detecting completion of a preceding task in the task queue.

13. The method of claim 12, wherein the first task performance information includes at least one of:

scheduling information for the first user, including one or more tasks assigned to the first user, times when the first user is available to perform tasks, a success rate of the first user based on previously-completed tasks, and a productivity of the first user corresponding to an amount of time it takes the first user to complete tasks.

14. The method of claim 12, wherein applying the machine learning model to the first candidate task schedule further comprises:

applying the machine learning model to a set of input data including the first candidate task schedule and at least one of:

equipment characteristics for (a) equipment required to perform the first task, and (b) one or more sets of equipment corresponding to one or more work centers corresponding to a performance of one or more additional tasks in the second task schedule; and material characteristics for (a) materials required to perform the first task, and (b) one or more sets of materials corresponding to the performance of the one or more additional tasks in the second task schedule.

15. The method of claim 12, further comprising:

generating, in a graphical user interface (GUI), a first digital representation of the second task schedule; and modifying the first digital representation of the second task schedule to include an interface element representing the first task to generate a second digital representation of a third task schedule including the first task, wherein the second digital representation depicts the first task in association with the first user.

16. The method of claim 12, wherein the second task schedule comprises a first configuration of a set of tasks to be performed at a plurality of work centers in a work environment, wherein predicting the first downstream effect of assigning the first task to the first user comprises predicting a delay in performing one or more tasks in the second task schedule resulting from including the first task in the second task schedule.

17. The method of claim 12, further comprising:

responsive to comparing the first set of user qualifications to the plurality of sets of user qualifications corresponding to the plurality of users: identifying a filtered set of users, including the first user, with user qualifications that match the first set of user qualifications recommended for the first task, wherein applying the machine learning model to the first candidate task schedule for the first user is performed responsive to detecting a selection of the first user from among the filtered set of users.

18. The method of claim 17, wherein detecting the selection of the first user from among the filtered set of users includes detecting a first login by the first user to first terminal running a task management application prior to detecting any login of any other user among the filtered set of users into any terminal running the task management application.

19. A system comprising:

one or more processors; and memory storing instructions that, when executed by the one or more processors, cause the system to perform operations comprising:

training a machine learning model to predict downstream effects of assigning tasks to users, the training comprising:

obtaining training datasets, each training dataset comprising:

historical task schedule data describing tasks performed at work centers by users;

historical user data of users performing the tasks at the work centers, the historical user data including: historical user qualifications, historical work history data, historical task completion success rates, and historical time to complete the tasks;

applying the training datasets to the machine learning model to generate an initial set of predictions;

comparing the initial set of predictions to labels; and retraining the machine learning model to adjust parameters of the machine learning model based on differences between the initial set of predictions and the labels;

identifying, by a work environment management engine, a first task corresponding to a first set of task parameters, the first set of task parameters including at least: a piece of equipment associated with performance of the first task and a first set of user qualifications recommended for performing the first task;

comparing, by the work environment management engine, the first set of user qualifications to a plurality of sets of user qualifications corresponding to a plurality of users;

responsive to comparing the first set of user qualifications to the plurality of sets of user qualifications corresponding to the plurality of users: identifying, by the work environment management engine, a first user with user qualifications that match the first set of user qualifications recommended for the first task;

retrieving, by the work environment management engine, first task performance information for the first user, the first task performance information comprising at least one of (a) scheduling information, and (b) historical task-completion information for the first user;

based on the first task performance information: generating, by the work environment management engine, a first candidate task schedule for a first workstation that includes assignment of the first task to the first user at the first workstation; and applying, by the work environment management engine, the machine learning model to the first candidate task schedule to predict a first downstream effect of assigning the first task to the first workstation, wherein the first downstream effect comprises an effect on the performance of one or more tasks in a second task schedule, wherein the first downstream effect comprises a first modification to the second task schedule, and wherein predicting the first downstream effect comprises predicting, based on the assignment of the first task to the first user at the first workstation, a change in a completion time of one or more tasks assigned to a second workstation that is different from the first workstation; and responsive to predicting the first downstream effect of assigning the first task to the first workstation:

determining, by the work environment management engine, if the performance of the one or more tasks in the second task schedule meets a performance threshold; and based on determining the performance of the one or more tasks in the second task schedule meets the performance threshold:

transmitting instructions to a first workstation computing device to modify a task queue of the first workstation to include the first task, wherein the first workstation computing device presents the first task for execution at the first workstation based on detecting completion of a preceding task in the task queue.

* * * * *